(12) United States Patent
Kobayashi

(10) Patent No.: US 10,108,878 B2
(45) Date of Patent: Oct. 23, 2018

(54) IMAGE PROCESSING APPARATUS, IMAGE PROCESSING METHOD, AND STORAGE MEDIUM FOR TONE CONTROL OF EACH OBJECT REGION IN AN IMAGE

(71) Applicant: CANON KABUSHIKI KAISHA, Tokyo (JP)

(72) Inventor: Satoru Kobayashi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 141 days.

(21) Appl. No.: 15/240,136

(22) Filed: Aug. 18, 2016

(65) Prior Publication Data

US 2017/0061237 A1   Mar. 2, 2017

(30) Foreign Application Priority Data

Aug. 24, 2015 (JP) .................................. 2015-165151

(51) Int. Cl.
*G06K 9/46* (2006.01)
*G06T 5/00* (2006.01)
(Continued)

(52) U.S. Cl.
CPC ......... *G06K 9/4671* (2013.01); *G06K 9/4642* (2013.01); *G06K 9/52* (2013.01);
(Continued)

(58) Field of Classification Search
CPC .... G06K 9/00228; G06K 9/34; G06K 9/4642; G06K 9/4661; G06K 9/4671; G06K 9/52; G06K 9/6267; G06K 2009/4666; G06T 5/00; G06T 5/009; G06T 5/40; G06T 7/0081; G06T 7/60; G06T 2207/20004;
(Continued)

(56) References Cited

U.S. PATENT DOCUMENTS 5,724,456 A * 3/1998 Boyack ................... G06T 5/009
345/428
8,599,257 B2 * 12/2013 Takahashi ............... G06T 7/136
348/148

(Continued)

FOREIGN PATENT DOCUMENTS

JP        11339035 A   * 12/1999
JP      2009-071768 A     4/2009

*Primary Examiner* — Yubin Hung
(74) *Attorney, Agent, or Firm* — Cowan, Liebowitz & Latman, P.C.

(57) ABSTRACT

An image processing apparatus includes: an object region detection unit; a main object region detection unit; a representative luminance value calculation unit configured to calculate one representative luminance value of each object region, by weighting the main object region in that object region; a luminance distribution calculation unit configured to calculate a luminance distribution in each object region, by weighting the main object region in that object region; a tone characteristics determination unit configured to determine tone characteristics for controlling tones of the input image, based on the representative luminance values of the object regions and the luminance distributions in the object regions; and a tone correction unit configured to correct the tones of the input image, using the tone characteristics determined by the tone characteristics determination unit.

12 Claims, 8 Drawing Sheets

(51) Int. Cl.
*G06K 9/52* (2006.01)
*G06K 9/62* (2006.01)
*G06T 5/40* (2006.01)
*G06K 9/00* (2006.01)
*G06K 9/34* (2006.01)

(52) U.S. Cl.
CPC ............ *G06K 9/6267* (2013.01); *G06T 5/008* (2013.01); *G06T 5/009* (2013.01); *G06T 5/40* (2013.01); *G06K 9/00228* (2013.01); *G06K 9/34* (2013.01); *G06K 9/4661* (2013.01); *G06K 2009/4666* (2013.01); *G06T 2207/20004* (2013.01)

(58) Field of Classification Search
CPC . G06T 2207/20112; G06T 2207/20172; G06T 5/007; G06T 5/008
See application file for complete search history.

(56) References Cited

U.S. PATENT DOCUMENTS

| | | | |
|---|---|---|---|
| 2003/0002736 A1* | 1/2003 | Maruoka | G06T 5/009 382/168 |
| 2003/0038957 A1* | 2/2003 | Sharman | H04N 1/4074 358/1.9 |
| 2008/0174605 A1* | 7/2008 | Kiuchi | G09G 3/22 345/531 |
| 2009/0123067 A1* | 5/2009 | Kuniba | G06T 5/009 382/167 |
| 2011/0279732 A1* | 11/2011 | Kanda | H04N 5/57 348/687 |
| 2013/0294683 A1* | 11/2013 | Yamashita | H04N 13/0018 382/154 |
| 2014/0226903 A1* | 8/2014 | Kimura | G06T 5/008 382/173 |

* cited by examiner

INPUT IMAGE

SKY REGION

BACKGROUND REGION

WINDOW SCAN

MAIN OBJECT REGION

FIG. 6A

| 1 | 1 | 1 | 1 | 1 | 1 | 1 | 1 | 1 | 1 | 1 | 1 |
|---|---|---|---|---|---|---|---|---|---|---|---|
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |

MAIN OBJECT WEIGHT COEFFICIENTS
FOR SKY REGION

FIG. 6B

| 1 | 1 | 1 | 1 | 1 | 1 | 1 | 1 | 1 | 1 | 1 | 1 |
|---|---|---|---|---|---|---|---|---|---|---|---|
| 1 | 1 | 1 | 1 | 2 | 2 | 2 | 2 | 1 | 1 | 1 | 1 |
| 1 | 1 | 1 | 1 | 2 | 4 | 4 | 2 | 1 | 1 | 1 | 1 |
| 1 | 1 | 1 | 1 | 2 | 4 | 4 | 2 | 1 | 1 | 1 | 1 |
| 1 | 1 | 1 | 1 | 2 | 2 | 2 | 2 | 1 | 1 | 1 | 1 |
| 1 | 1 | 1 | 1 | 1 | 1 | 1 | 1 | 1 | 1 | 1 | 1 |

MAIN OBJECT WEIGHT COEFFICIENTS
FOR BACKGROUND REGION

IMAGE PROCESSING APPARATUS, IMAGE PROCESSING METHOD, AND STORAGE MEDIUM FOR TONE CONTROL OF EACH OBJECT REGION IN AN IMAGE

BACKGROUND OF THE INVENTION

Field of the Invention

The present invention relates to an image processing apparatus, and in particular relates to an image processing technique for performing optimal tone control for each object region in an image.

Description of the Related Art

Conventionally, it is known that blown-out highlights or blocked-up shadows occur in a part of a captured image when the dynamic range of an image sensor for the captured object is insufficient. For example, in the case of capturing an image of a person outdoors against the light on a sunny day, since the luminance of the sky is far greater than that of the person, blown-out highlights occur in the entire sky region under exposure conditions suitable for the person, and blocked-up shadows occur in the person region under exposure conditions suitable for the sky.

For such a view against the lights, Japanese Patent Laid-Open No. 2009-71768 has disclosed a technique for controlling tones so as to prevent blown-out highlights and blocked-up shadows. Japanese Patent Laid-Open No. 2009-71768 suppresses blown-out highlights and blocked-up shadows by detecting a face region, and controlling brightness and tones of the face based on the brightness of the face region and its surrounding region.

However, since the technique disclosed in Japanese Patent Laid-Open No. 2009-71768 is a tone control method specific to face regions as described above, blown-out highlights or blocked-up shadows of objects other than faces (e.g., flowers, animals, or still subjects) cannot be suppressed.

SUMMARY OF THE INVENTION

The present invention was made in view of the above-described problems, and controls tones so as to improve tones of a main object region in a captured image, without impairing tones of regions other than the main object region.

According to a first aspect of the present invention, there is provided an image processing apparatus comprising: an object region detection unit configured to detect a plurality of object regions in an input image; a main object region detection unit configured to detect a main object region in the object regions; a representative luminance value calculation unit configured to calculate one representative luminance value of each object region, by weighting the main object region in that object region; a luminance distribution calculation unit configured to calculate a luminance distribution in each object region, by weighting the main object region in that object region; a tone characteristics determination unit configured to determine tone characteristics for controlling tones of the input image, based on the representative luminance values of the object regions calculated by the representative luminance value calculation unit and the luminance distributions in the object regions calculated by the luminance distribution calculation unit; and a tone correction unit configured to correct the tones of the input image, using the tone characteristics determined by the tone characteristics determination unit.

According to a second aspect of the present invention, there is provided an image processing method comprising: detecting a plurality of object regions in an input image; detecting a main object region in the object regions; calculating one representative luminance value of each object region, by weighting the main object region in that object region; calculating a luminance distribution in each object region, by weighting the main object region in that object region; determining tone characteristics for controlling tones of the input image, based on the calculated representative luminance values of the object regions and the calculated luminance distributions in the object regions; and correcting the tones of the input image, using the determined tone characteristics.

Further features of the present invention will become apparent from the following description of exemplary embodiments with reference to the attached drawings.

BRIEF DESCRIPTION OF THE DRAWINGS

FIGS. 6A and 6B are diagrams showing main object weight coefficients.

DESCRIPTION OF THE EMBODIMENTS

Figure 1:
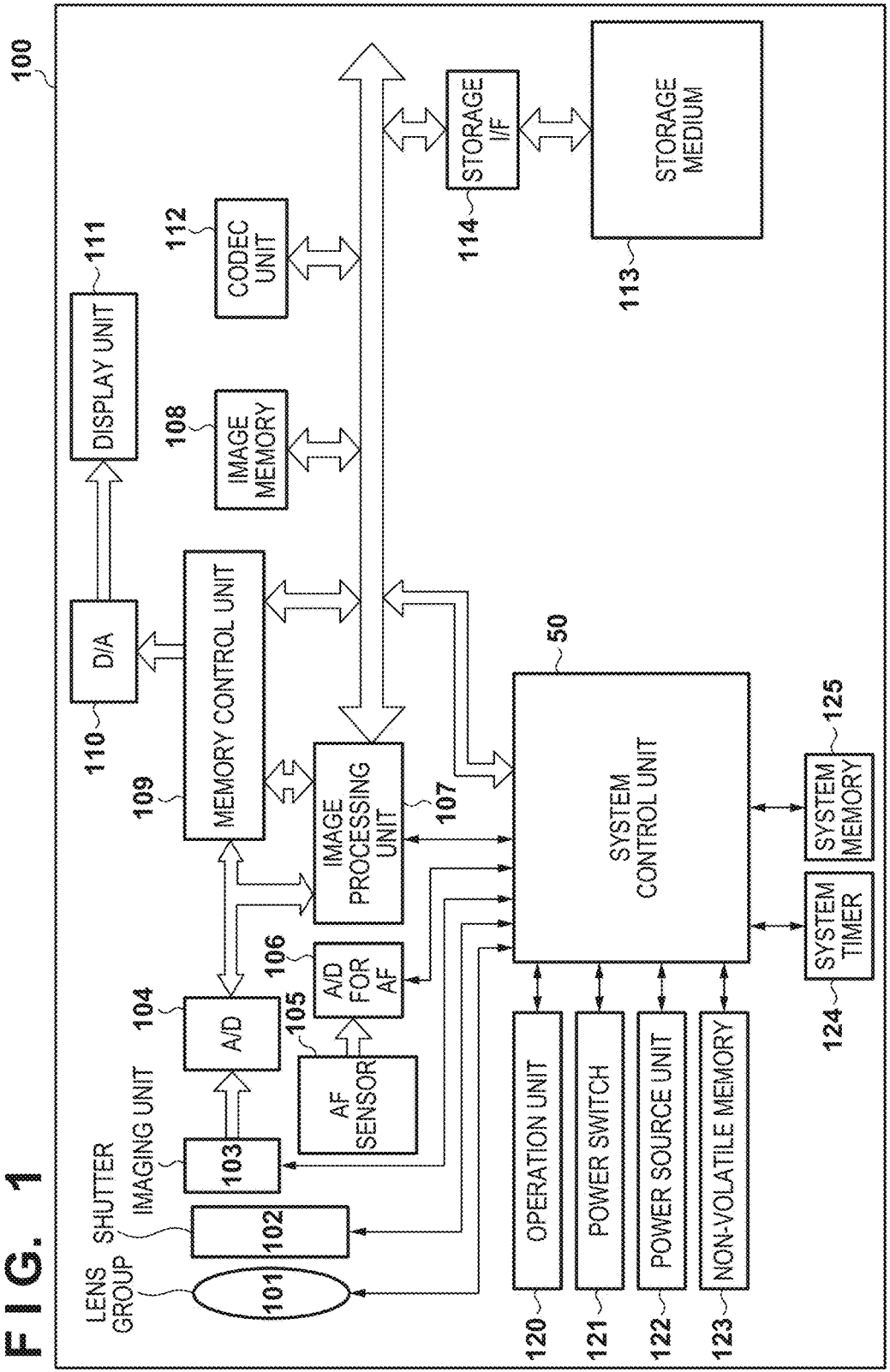
FIG. 1 is a block diagram of an embodiment in which an image processing apparatus of the present invention is applied to an image capturing apparatus.

Hereinafter, an embodiment of the present invention will be described in detail with reference to the attached drawings. FIG. 1 is a block diagram showing the configuration of an embodiment in which an image processing apparatus for performing tone control of the present invention is applied to an image capturing apparatus. An image capturing apparatus 100 in this embodiment detects a main object region in captured image data, and performs tone control in which a weight is applied to the main object region. Hereinafter, this embodiment will be described with reference to FIG. 1.

In FIG. 1, a lens group 101 includes a zoom lens and a focus lens. A shutter 102 has an aperture function. An imaging unit 103 includes an image sensor such as a CCD or CMOS sensor for converting an optical image into an electrical signal. An A/D converter 104 converts an analog signal output by the imaging unit 103 into a digital signal. An AF sensor 105 is configured by a CCD or CMOS sensor or the like for converting an optical image into an electrical signal for AF control. An A/D converter 106 for AF converts an analog signal output by the AF sensor 105 into a digital signal. An image processing unit 107 performs various types of image processing such as white balance processing and tone correction processing on image data output from the A/D converter 104. An image memory 108 is controlled by a memory control unit 109. A D/A converter 110 converts an input digital signal into an analog signal, and displays the analog signal on a display unit 111 such as an LCD. A codec unit 112 compresses and encodes, and decodes image data.

A storage medium 113 is configured by a memory card, a hard disk, or the like for storing image data. A storage I/F 114 is an interface for the storage medium 113. A system control unit 50 controls the entire system of the image capturing apparatus 100. An operation unit 120 has an operation member through which a user inputs various operation instructions. A power switch 121 inputs an ON/OFF signal of the power source to the system control unit 50, and a power source unit 122 is controlled by the system control unit 50. A non-volatile memory 123 is an electrically erasable and recordable memory, and is, for example, an EEPROM or the like. A system timer 124 measures the time used for various types of control and the time on a built-in clock. A system memory 125 is used to deploy constants and variables for operations of the system control unit 50, programs read from the non-volatile memory 123, and the like.

Next, the flow of basic processing when capturing an image using the thus configured image capturing apparatus 100 will be described.

The imaging unit 103 photoelectrically converts light that is incident via the lens group 101 and the shutter 102, and outputs an analog image signal to the A/D converter 104. The A/D converter 104 converts the analog image signal output from the imaging unit 103 into a digital image signal, and outputs the digital image signal to the image processing unit 107. The AF sensor 105 causes a plurality of pairs of line sensors to receive light that is incident via the lens group 101 and the shutter 102 and to output signals to the A/D converter 106 for AF. The A/D converter 106 for AF converts the analog signals output from the AF sensor 105 into digital signals, and outputs the digital signals to the system control unit 50. The system control unit 50 detects a relative displacement amount in a light beam splitting direction of the object image based on the image signals output by each pair of line sensors, and performs so-called phase difference AF control.

The image processing unit 107 performs various types of image processing such as white balance processing and tone correction processing on the image data from the A/D converter 104 or the image data read from the memory control unit 109. Note that tone correction processing will be described later in detail. The image data output from the image processing unit 107 is written to the image memory 108 via the memory control unit 109. Furthermore, the image processing unit 107 performs predetermined operation processing using image data captured by the imaging unit 103, and the system control unit 50 performs exposure control and focus adjustment control based on obtained operation results. Accordingly, AE (auto exposure) processing, AF (auto focus) processing, and the like are performed.

The image memory 108 stores image data output from the imaging unit 103 and image data that is to be displayed on the display unit 111. Furthermore, the D/A converter 110 converts data for image display, stored in the image memory 108, into an analog signal, and supplies the analog signal to the display unit 111. The display unit 111 performs display on a display device such as an LCD, according to the analog signal from the D/A converter 110. The codec unit 112 compresses and encodes image data stored in the image memory 108, according to a standard such as JPEG or MPEG.

The system control unit 50 performs, in addition to the above-described basic operation, various types of processing (described later) of this embodiment by executing programs stored in the above-described non-volatile memory 123. The programs herein are programs for executing various flowcharts, which will be described later in this embodiment. At this time, constants and variables for operations of the system control unit 50, programs read from the non-volatile memory 123, and the like are deployed on the system memory 125. Above, the configuration and basic operations of the image capturing apparatus 100 have been described.

Figure 2:
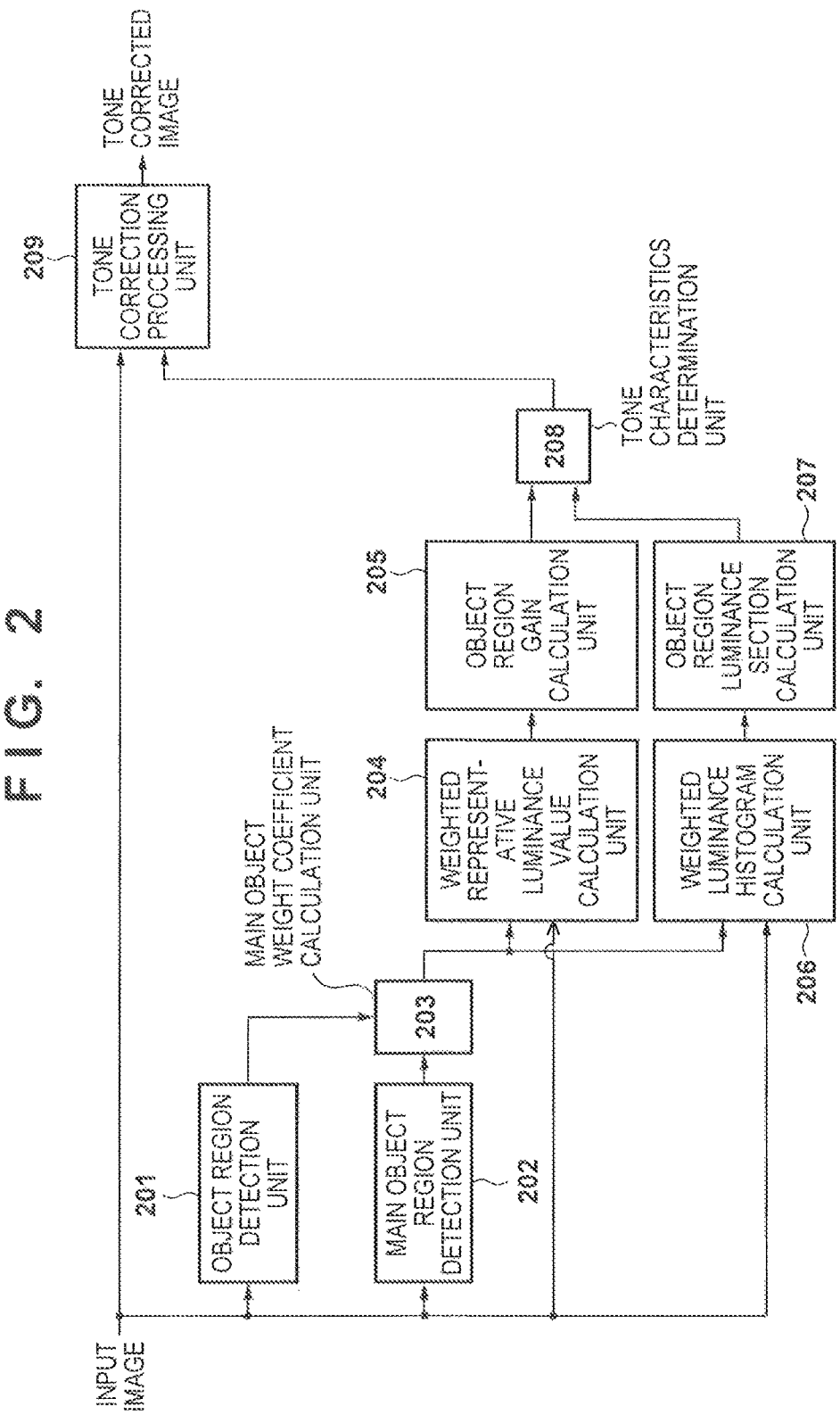
FIG. 2 is a diagram showing a configuration of the portions that perform tone control processing in an image processing unit.

Next, the image processing unit 107 will be described in detail. First, the configuration of those portions of the image processing unit 107 that perform tone correction processing will be described with reference to FIG. 2.

The image processing unit 107 has a configuration for performing tone correction processing, including an object region detection unit 201, a main object region detection unit 202, and a main object weight coefficient calculation unit 203. Furthermore, downstream of these units, a weighted representative luminance value calculation unit 204, an object region gain calculation unit 205, a weighted luminance histogram calculation unit 206, an object region luminance section calculation unit 207, a tone characteristics determination unit 208, and a tone correction processing unit 209 are arranged.

Figure 3:
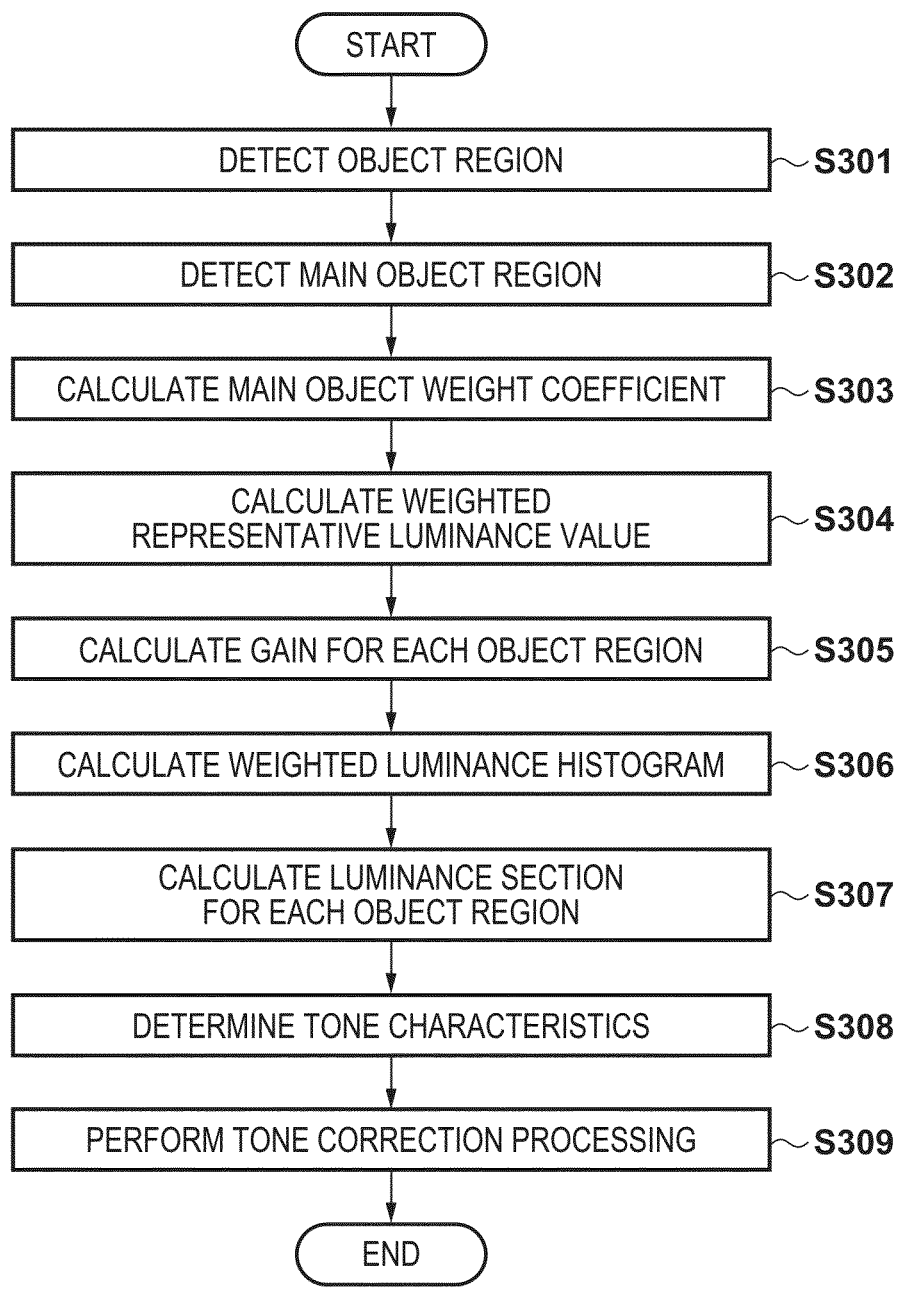
FIG. 3 is a flowchart showing operations of tone correction processing performed by the image processing unit.

Next, the operations of tone correction processing performed by the image processing unit 107 will be described with reference to the flowchart in FIG. 3.

First, when tone correction processing is started, the object region detection unit 201 detects a specific object region from an input image in step S301. In this embodiment, for example, a sky region is detected. It is assumed that the method for detecting is such that the sky region is detected by an existing technique using luminance values, color information, edge information, or the like, and a detailed description thereof has been omitted.

Figure 4A:
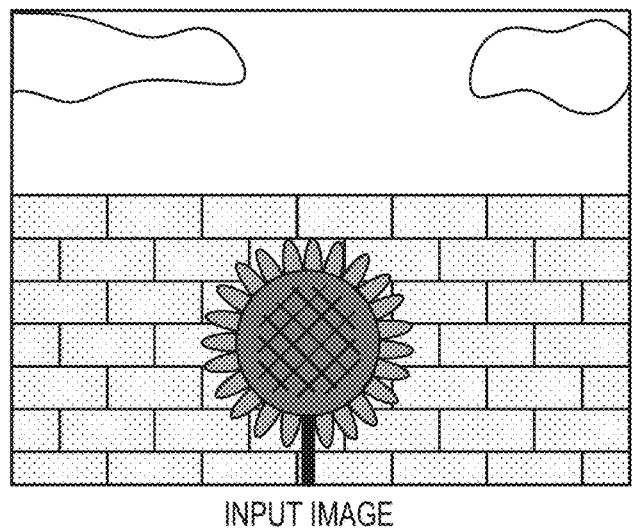
FIGS. 4A to 4C are diagrams showing a method for detecting an object region.
Figure 4B:
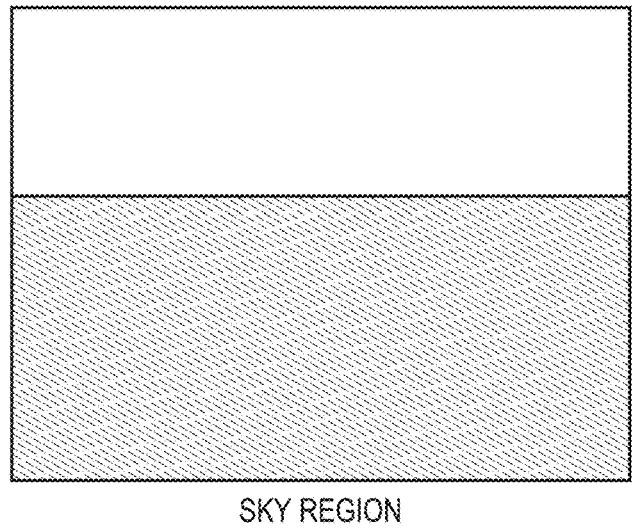
Figure 4C:
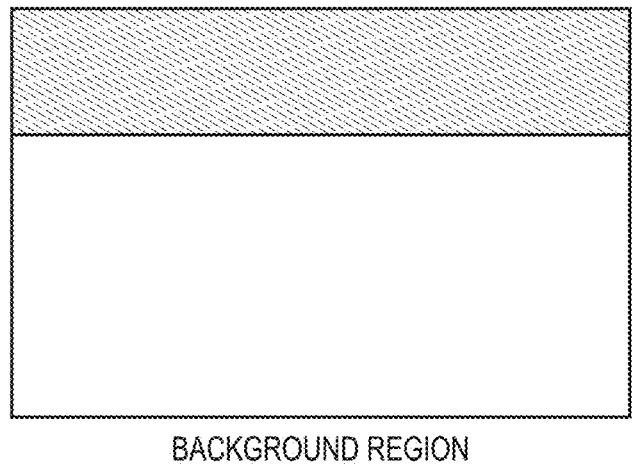

FIGS. 4A to 4C show an example of detection of an object region. FIG. 4A shows an input image. FIG. 4B shows a detection result of a sky region, where a white region indicates the detected sky region. FIG. 4C shows a detection result of a background region, where a white region indicates the detected background region. The object region detection unit 201 detects a sky region using an existing technique from an input image as in FIG. 4A, and outputs sky region information as in FIG. 4B. Furthermore, the object region detection unit 201 defines the region other than the sky region as a background region, and outputs background region information as in FIG. 4C.

Below, an example will be described in which the object region detection unit 201 outputs two pieces of region information, but the number of object regions that are to be detected is not limited to two. For example, three or more object regions may be detected by also detecting an object other than the sky such as a forest or a building.

In step S302, the main object region detection unit 202 detects a main object, which is the main object among the objects in the input image. The method for detecting a main object will be described with reference to FIGS. 5A and 5B.

Figure 5A:
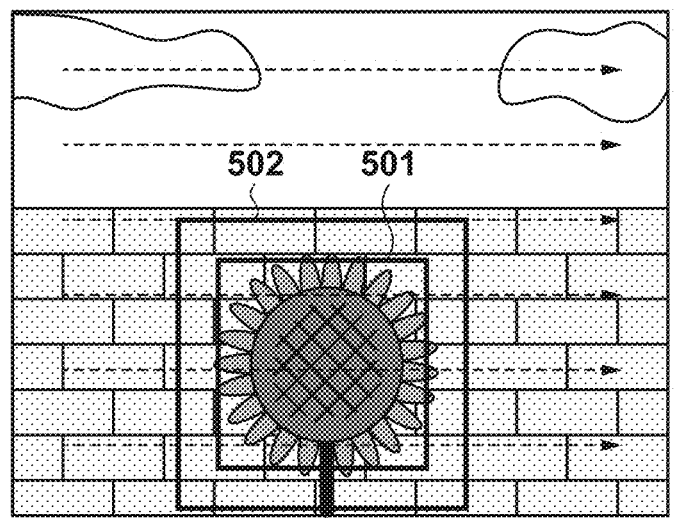
FIGS. 5A and 5B are diagrams showing a method for detecting a main object region.
Figure 5B:
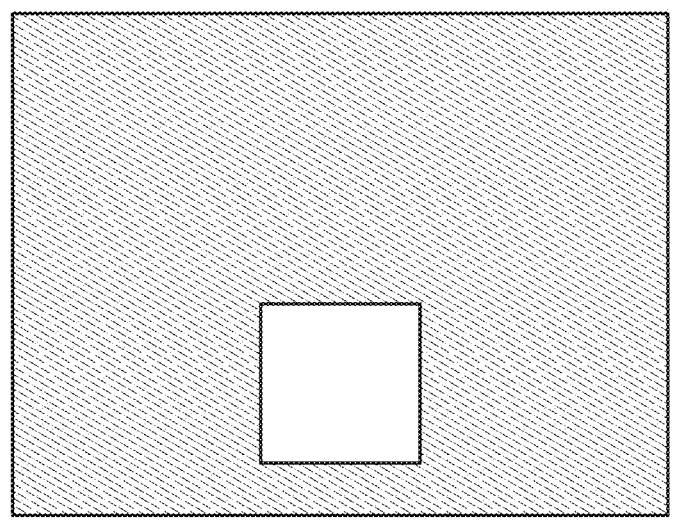

FIG. 5A is a diagram showing an example of an inner region 501 and a surrounding region 502 for detecting a main object region, and FIG. 5B is a diagram showing a visual saliency degree, which is a detected main object degree. Note that, in FIG. 5B, the main object degree increases as the color becomes whiter.

The main object region detection unit 202 moves the inner region 501 and the surrounding region 502 throughout the screen, and compares the histogram of the inner region 501 and the histogram of the surrounding region 502 at a plurality of positions. If a difference between the histogram of the inner region 501 and the histogram of the surrounding region 502 is large, it is judged that this region is a conspicuous region, and a large visual saliency degree is calculated. On the other hand, if a difference between the histogram of the inner region 501 and the histogram of the surrounding region 502 is small, it is judged that this region is an inconspicuous region, and a small visual saliency degree is calculated.

In the example of a view with a sunflower in FIG. 4A, when the inner region is positioned around the sunflower as in FIG. 5A, a difference between the histogram of the inner region 501 and the histogram of the surrounding region 502 is large, and thus the visual saliency degree indicates a large value. On the other hand, when the inner region is not positioned around the sunflower (e.g., positioned in the sky), a difference between the histogram of the inner region 501 and the histogram of the surrounding region 502 is small, and thus the visual saliency degree indicates a small value. The main object region detection unit 202 outputs a region in which the thus calculated visual saliency degree is large, as a main object region.

Note that the method for detecting a main object region is not limited to the method based on the visual saliency degree. For example, the main object region may be an in-focus region, a tracked object region, a similar color region having a large size in the screen center, or a region specified by a user via the operation unit 120.

In step S303, the main object weight coefficient calculation unit 203 calculates, for each object region, a weight coefficient of a main object region. A method for calculating a main object weight coefficient will be described with reference to FIGS. 4A to 4C, 5A, 5B, 6A, and 6B.

First, calculation of a main object weight coefficient in the sky region will be described. Based on the sky region information in FIG. 4B detected by the object region detection unit 201 and the main object region information in FIG. 5B detected by the main object region detection unit 202, the main object weight coefficient calculation unit 203 divides each object region into blocks, and calculates main object weight coefficients as in FIG. 6A. In the example of this embodiment, there is no main object region in the sky region, and thus all main object weight coefficients in the blocks in the sky region have the same value (weight coefficient 1). That is to say, weighting is not performed in the sky region.

Next, calculation of a main object weight coefficient in the background region will be described. Based on the background region information in FIG. 4C detected by the object region detection unit 201 and the main object region information in FIG. 5B detected by the main object region detection unit 202, the main object weight coefficient calculation unit 203 divides each object region into blocks, and calculates main object weight coefficients as in FIG. 6B. In the example of this embodiment, there is a main object region in the background region, and thus weight coefficients of a region having the main object in the background region are set to large values as in FIG. 6B. In this manner, the main object weight coefficient calculation unit 203 calculates main object weight coefficients such that a weight coefficient of a main object region that overlaps an object region is high.

Note that, as in FIG. 6B, the main object weight coefficients may be set to small values near the boundary of the main object region. The reason for this is that the influence in the case where the detected main object region is larger than the actual object region can be reduced. Furthermore, if there is a main object region in both the sky region and the background region, weight coefficients of the main object regions are set to large values in both the sky region and the background region.

Furthermore, the main object weight coefficient may be changed in accordance with the main object degree. Specifically, the main object weight coefficient (level of weighting) is calculated according to Equation (1) below.

Main object weight coefficient=α×main object degree+reference weight coefficient (1)

where α is a fixed factor that is multiplied by the main object degree. Reference weight coefficient is a value that is a reference for the weight coefficient, and the reference weight coefficient is 1 in the example in FIGS. 6A and 6B. According to Equation (1), the main object weight coefficient increases for a region having a larger main object degree.

In step S304, the weighted representative luminance value calculation unit 204 calculates, for each object region, a weighted representative luminance value based on the main object weight coefficients in that object region. A method for calculating a weighted representative luminance value will be described with reference to FIGS. 6A and 6B. First, the weighted representative luminance value calculation unit 204 divides the input image into blocks, and calculates a luminance integral value for each block. It is assumed that the size of each divided block matches the size of each block whose main object weight coefficient has been calculated. Next, the weighted representative luminance value calculation unit 204 calculates a weighted average of the luminance integral values calculated for the respective blocks, based on the main object weight coefficients, and outputs the weighted average as a weighted representative luminance value. The weighted representative luminance value calculation unit 204 calculates one weighted representative luminance value for each object region. Accordingly, a weighted representative luminance value closer to an average luminance value of a main object region can be calculated for each object region. In the example of this embodiment, with the main object weight coefficients of the background region in FIG. 6B, a weighted representative luminance value closer to the average luminance value of the main object region is calculated.

In step S305, the object region gain calculation unit 205 calculates a gain that sets the weighted representative luminance value to a predetermined luminance value, for each object region. The predetermined luminance value is a target value for correcting the brightness of the object region to a proper value. Specifically, if the weighted representative luminance value of the background region is 500 and the predetermined luminance value, which is a proper brightness value of the background region, is 1000, the gain is calculated as double.

Figure 7:
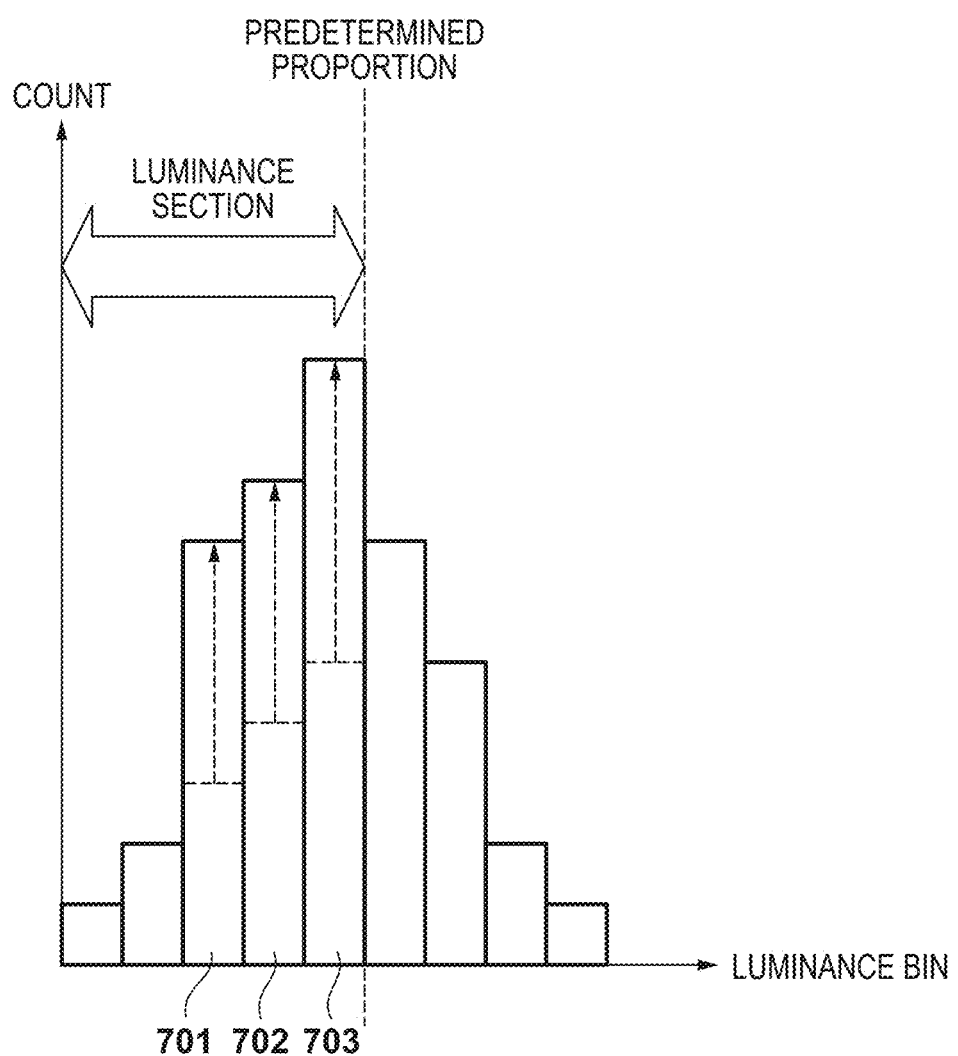
FIG. 7 is a diagram showing a weighted luminance histogram.

In step S306, the weighted luminance histogram calculation unit 206 calculates, for each object region, a weighted luminance histogram based on the main object weight coefficients in that object region (luminance distribution calculation). A method for calculating a weighted luminance histogram will be described with reference to FIGS. 6A, 6B, and 7. FIG. 7 is a diagram showing a weighted luminance histogram for each object region.

The weighted luminance histogram calculation unit 206 calculates, for each object region, one luminance histogram based on the main object weight coefficients in FIGS. 6A and 6B. The weighted luminance histogram in this embodiment refers to a histogram for adjusting histogram count values based on the main object weight coefficients. For example, if a main object weight coefficient is "4", a count value of a region indicating the main object weight coefficient is multiplied by 4 to obtain the histogram. For example, if the luminance values of the main object region are distributed to a bin 701, a bin 702, and a bin 703 in FIG. 7, the count value of the main object region is increased by being multiplied by the main object weight coefficient, and thus the count value becomes larger than the case where no weight is applied.

In step S307, the object region luminance section calculation unit 207 calculates a luminance section, for each object region, based on the weighted luminance histogram for that object region. The luminance section for each object region refers to information indicating a luminance section to which the gain calculated for that object region is to be applied. The luminance section for each object region will be described with reference to FIG. 7.

First, the object region luminance section calculation unit 207 cumulatively adds the count values of the weighted luminance histogram from the low luminance side or the high luminance side, and calculates a luminance bin value at which the accumulated sum (accumulated luminance distribution) reaches a predetermined proportion of the total count value (total accumulated number). Then, a section from the low luminance side or the high luminance side at which cumulative addition was started to the luminance bin value at which the predetermined proportion was reached is taken as a luminance section. The luminance side from which cumulative addition is started is determined based on the average luminance of the object region. For example, the average luminances of the background region and the sky region are compared, and, if the average luminance of the background region is smaller, cumulative addition is performed from the low luminance side in the background region, and cumulative addition is performed from the high luminance side in the sky region. FIG. 7 shows an example in which cumulative addition is performed from the low luminance side, where the luminance section is the section from the low luminance side to the luminance bin 703 because, when cumulatively added from the low luminance side to the luminance bin 703, the count values reach the predetermined proportion or more of the total count value.

Figure 8:
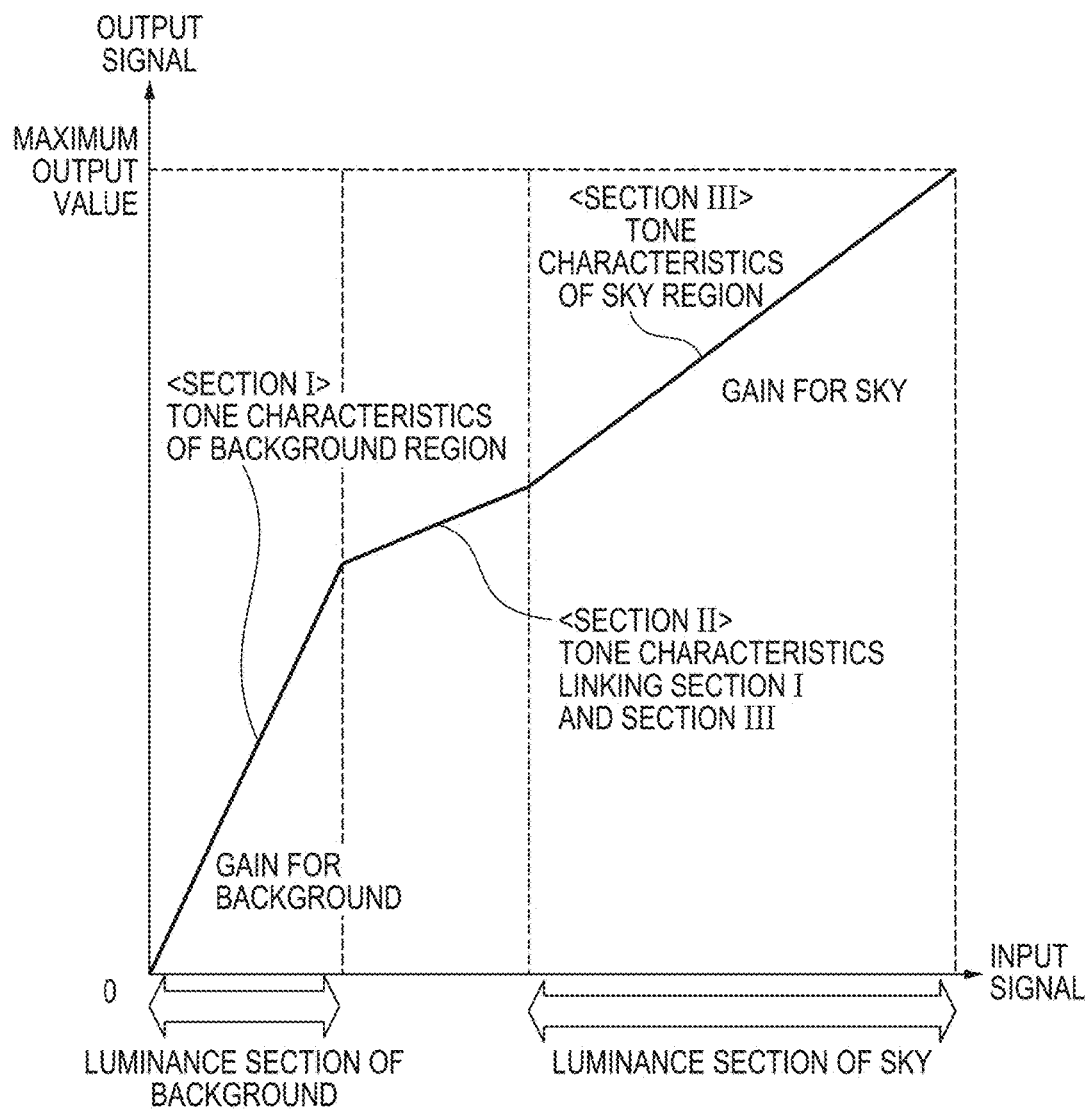
FIG. 8 is a diagram showing tone characteristics.

In step S308, the tone characteristics determination unit 208 determines tone characteristics based on the gain value and the luminance section of each object region. A method for determining tone characteristics will be described with reference to FIG. 8. FIG. 8 is a diagram showing an example of tone characteristics in the case where the background region is darker than the sky region.

First, the tone characteristics of the background region in a section I will be described. The tone characteristics determination unit 208 determines a slope of the tone characteristics in the luminance section of the background region, according to the gain value of the background region. That is to say, the tone characteristics in the luminance section of the background region are represented by a straight line extending through the origin and having a slope that conforms to the gain value of the background region.

Next, the tone characteristics of the sky region in a section III will be described. The tone characteristics determination unit 208 determines a slope of the tone characteristics in the luminance section of the sky region, according to the gain value of the sky region. That is to say, the tone characteristics in the luminance section of the sky region are represented by a straight line extending through the maximum output value and having a slope that conforms to the gain value of the sky region.

If the luminance section of the background region and the luminance section of the sky region do not overlap each other, the straight lines representing the tone characteristics of the background region and the sky region do not intersect each other, and thus tone characteristics in a section II linking the straight lines representing the tone characteristics in the section I and the section III are provided. In this manner, the tone characteristics determination unit 208 determines tone characteristics based on the gain and the luminance section of each object region.

In step S309, the tone correction processing unit 209 corrects the tones of the input image based on the tone characteristics obtained in step S308. Specifically, the tone characteristics are converted into the gains of the output signals with respect to the input signals, and are multiplied by the pixel values of the input image. If the tone characteristics are determined and the tones are corrected in this manner, it is possible to improve the tones of the main object region and to allow the tones of the region other than the main object region to be easily maintained.

For example, in the input image in FIG. 4A, the sunflower included in the main object region belonging to the background region is darker than the background region other than the sunflower. Thus, in the case of using the tone control of this embodiment, the gain of the background region becomes higher and the luminance section, which is a section from the origin to a position closer to the low luminance side, becomes narrower than those in the case of not using the main object weight coefficients. If the gain and the luminance section are controlled in this manner, the tones of the intermediate luminance region in the section II can be maintained without being impaired.

Note that the object region gain calculation unit 205 may adjust a gain of each object region according to the area ratio of the object regions. For example, if the area of the background region is larger than the area of the sky region as in the example in FIGS. 4A to 4C, the gain of the background region is adjusted to be larger, and the gain of the sky region is adjusted to be smaller, conversely.

Furthermore, the object region gain calculation unit 205 may adjust the gain according to the weighted area ratio obtained by being multiplied by the main object weight coefficient. Specifically, in the case of the main object weight coefficients as in FIG. 6B, the area of the background region is calculated by being multiplied by the main object weight coefficient (area calculation). Accordingly, the area of the background region increases, and thus the object region gain calculation unit 205 adjusts the gain of the background region to be larger and adjusts the gain of the sky region to be smaller.

Note that the main object weight coefficient may be adjusted according to a difference between the average luminances of the main object region and the object region other than the main object region. Specifically, first, a difference between the average luminance of the main object region and the average luminance of the object region other than the main object region (e.g., the region having a weight coefficient of 1 in FIG. 6B) is calculated (average luminance calculation). As the difference between the average luminances increases, the main object weight coefficient is set to a smaller value. For example, in FIG. 6B, the weight coefficient 4 is changed to 2. Although main objects may include objects having a high reflectance and objects having a low reflectance, a difference between the reflectances of the main objects cannot be seen from the image alone, and thus whether an object is a black object or a dark object cannot be determined. Thus, the main object weight coefficient is set to be smaller such that the brightness of a black object is not excessively high. Accordingly, the gain becomes smaller and the brightness of a black object is not excessively high.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-165151, filed Aug. 24, 2015, which is hereby incorporated by reference herein in its entirety.

What is claimed is:

1. An image processing apparatus comprising:
at least one processor or circuit configured to perform the operations of the following units:
an object region detection unit configured to detect a plurality of object regions in an input image;
a main object region detection unit configured to detect a main object region in the object regions;
a first average luminance calculation unit configured to calculate an average luminance of the main object region;
a second average luminance calculation unit configured to calculate an average luminance of a region excluding the main object region in the object region;
a representative luminance value calculation unit configured to calculate one representative luminance value of each object region, by weighting the main object region in that object region;
a luminance distribution calculation unit configured to calculate a luminance distribution in each object region, by weighting the main object region in that object region;
a tone characteristics determination unit configured to determine tone characteristics for controlling tones of the input image, based on the representative luminance values of the object regions calculated by the representative luminance value calculation unit and the luminance distributions in the object regions calculated by the luminance distribution calculation unit; and
a tone correction unit configured to correct the tones of the input image, using the tone characteristics determined by the tone characteristics determination unit,
wherein the representative luminance value calculation unit and the luminance distribution calculation unit change a level of the weighting, based on a difference between the average luminance of the main object region and the average luminance of the region excluding the main object region.

2. The image processing apparatus according to claim 1, wherein the at least one processor or circuit configured to further perform the operations of:
a gain calculation unit configured to calculate a gain of an image signal for each object region;
wherein the gain calculation unit calculates a gain that sets the representative luminance value to a predetermined luminance value, for each object region.

3. The image processing apparatus according to claim 2, wherein the at least one processor or circuit configured to further perform the operations of:
an area calculation unit configured to calculate an area of each object region, by weighting the main object region in that object region;
wherein the gain calculation unit adjusts the gain, based on a size of the area of each object region calculated by the area calculation unit.

4. The image processing apparatus according to claim 2, wherein the at least one processor or circuit configured to further perform the operations of:
a luminance section calculation unit configured to calculate a luminance section to which the gain is to be applied, based on the luminance distribution in the object region;
wherein the luminance section calculation unit calculates the luminance section, based on a luminance value at which an accumulated luminance distribution from a low luminance side or a high luminance side in a histogram of luminance distribution reaches a predetermined proportion of a total accumulated number of the luminance distribution of the histogram, for each object region.

5. The image processing apparatus according to claim 4, wherein the tone characteristics determination unit determines the tone characteristics, based on the gain and the luminance section calculated for each object region.

6. The image processing apparatus according to claim 1, wherein the representative luminance value calculation unit and the luminance distribution calculation unit change a level of the weighting, based on a main object degree of the main object region.

7. The image processing apparatus according to claim 1, wherein, in a case where the difference between the average luminance of the main object region and the average luminance of the region excluding the main object region is large, the representative luminance value calculation unit and the luminance distribution calculation unit set a smaller weight for the main object region.

8. The image processing apparatus according to claim 1, wherein the representative luminance value calculation unit and the luminance distribution calculation unit set a smaller weight for a vicinity of a boundary of the main object region.

9. The image processing apparatus according to claim 1, wherein the object region detection unit detects a specific object region.

10. The image processing apparatus according to claim 1, wherein the main object region detection unit detects a main object among a plurality of objects.

11. An image processing method comprising:
 detecting a plurality of object regions in an input image;
 detecting a main object region in the object regions;
 calculating an average luminance of the main object region;
 calculating an average luminance of a region excluding the main object region in the object region;
 calculating one representative luminance value of each object region, by weighting the main object region in that object region;
 calculating a luminance distribution in each object region, by weighting the main object region in that object region;
 determining tone characteristics for controlling tones of the input image, based on the calculated representative luminance values of the object regions and the calculated luminance distributions in the object regions; and
 correcting the tones of the input image, using the determined tone characteristics,
 wherein in the calculating the representative luminance value and the calculating the luminance distribution, a level of the weighting is changed based on a difference between the average luminance of the main object region and the average luminance of the region excluding the main object region.

12. A non-transitory computer-readable storage medium storing a program for causing a computer to execute an image processing method, the image processing method comprising:
 detecting a plurality of object regions in an input image;
 detecting a main object region in the object regions;
 calculating an average luminance of the main object region;
 calculating an average luminance of a region excluding the main object region in the object region;
 calculating one representative luminance value of each object region, by weighting the main object region in that object region;
 calculating a luminance distribution in each object region, by weighting the main object region in that object region;
 determining tone characteristics for controlling tones of the input image, based on the calculated representative luminance values of the object regions and the calculated luminance distributions in the object regions; and
 correcting the tones of the input image, using the determined tone characteristics,
 wherein in the calculating the representative luminance value and the calculating the luminance distribution, a level of the weighting is changed based on a difference between the average luminance of the main object region and the average luminance of the region excluding the main object region.

* * * * *